United States Patent Office 2,771,574
Patented Nov. 20, 1956

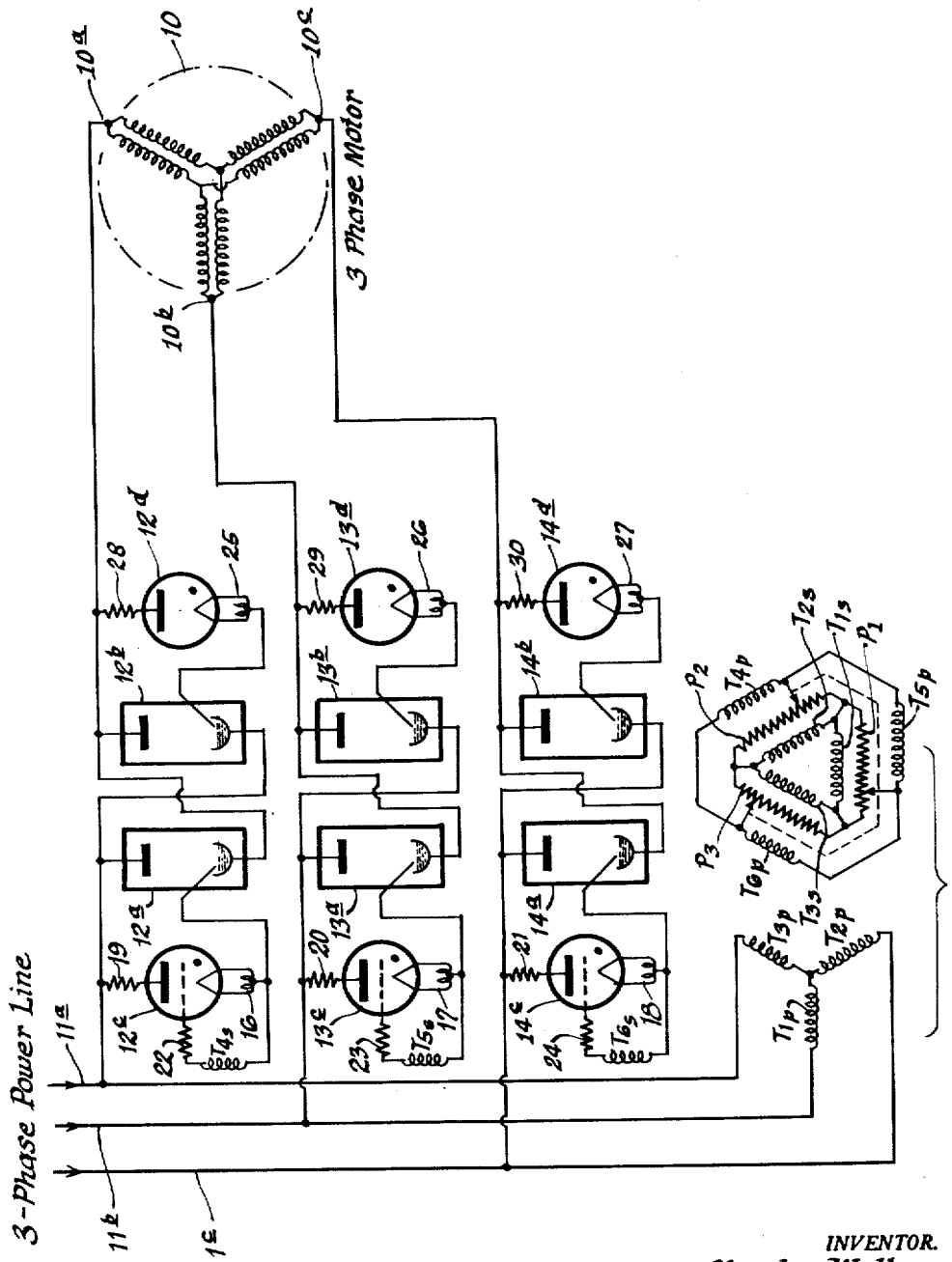

2,771,574

MOTOR-CONTROL APPARATUS

Charles Wetter, Geneva, Ill., assignor to National Electronics, Inc., Geneva, Ill., a corporation of Illinois Application January 19, 1956, Serial No. 560,102

5 Claims. (Cl. 318—227)

This invention relates to a novel means for starting and controlling the power supplied from three-phase power lines to load devices of various kinds; it is particularly useful for smoothly and safely starting three-phase motors of even the largest sizes. In the specific description of my invention herein, I describe it as particularly applied for motor control.

My control apparatus comprises banks of high-current mercury-vapor rectifiers of the type commonly called "ignitrons." Such tubes have been employed in the past for controlling large motors of both the D.-C. and A.-C. types. The use of ignitrons in controlling A.-C. motors, and particularly three-phase motors, has no been satisfactory, however, because of the difficulties encountered in supplying the respective ignitor electrodes with properly phased control voltages.

The primary object of the present invention is to provide an ignitron control circuit wherein the correct phasing of ignitor-electrode control voltages is accomplished automatically.

Another object of the present invention is to provide an ignitron control circuit for three-phase motors whereby the ignitrons are afforded positive protection against damage due to reverse flow of current through the ignitor electrodes, thus insuring long tube life and overcoming another serious disadvantage of prior-art apparatus.

An ignitron tube comprises an evacuated envelope containing a mercury-pool cathode, an anode, and a small electrode called an "ignitor" which is in contact with the surface of the mercury pool. No conduction can normally take place through the tube even though the anode be positive relative to the cathode. If, under those conditions, a pulse of voltage be applied to the ignitor, however, ionization of the mercury vapor will start and the tube will conduct. As in other types of grid-controlled gas tubes, conduction, once started, is no longer under the control of the ignitor but will continue so long as the anode remains positive relative to the cathode. Once the anode potential drops below that of the cathode, however, conduction ceases until it is again initiated by a pulse on the ignitor. That is, an ignitron will commence conduction only when two conditions are simultaneously satisfied: (1) the anode potential is positive relative to the cathode, and (2) a suitable initiating pulse is applied to the ignitor.

Employment of ignitrons for control of three-phase motors calls for six tubes, arranged in three pairs, the tubes in each pair being connected "back-to-back." Previous motor-control circuits of this sort have required simultaneous control of the ignitor voltages for all six tubes, and correct adjustment of such phasing has proved to be a very delicate and critical matter. The reason for this is that a motor, particularly during its starting period, presents a complex load the characteristics of which are changing rapidly as the motor gains speed. As a result, no fixed phase adjustment between the respective ignitor electrodes can possibly be correct throughout the starting interval.

In the present invention, that problem is completely solved, since in my invention direct control of ignitor voltage is employed only with respect to three of the six ignitrons—one in each pair—and the phasing of ignitor voltage on the other three tubes is accomplished automatically so that all six tubes "fire" at the proper portions of each cycle to achieve the desired result, throughout the entire period from initial starting to final motor operation at full speed. Achievement of this desirable result is an important objective of my invention.

In the single figure of the appended drawing I have shown schematically a motor-control circuit embodying my invention. In the drawing I have indicated schematically a typical three-phase motor 10 having three terminals respectively marked 10a, 10b, and 10c. Motor 10 is indicated as star-connected, but it may equally well be delta-connected.

A typical three-wire power line is shown consisting of conductors 11a, 11b, and 11c. In a typical case power line 11 might carry 60-cycle, three-phase power at 220 volts, although this again is a matter of designer's choice.

My control circuit proper includes six ignitron tubes arranged in three pairs of two tubes each, the tubes being marked 12a and 12b, 13a and 13b, and 14a and 14b.

As may be noted from the drawing, each pair of ignitron tubes is in back-to-back connection, that is, the cathode of one tube is connected to the anode of the other and vice versa. Each pair of tubes, in turn, is connected between one of the power-line conductors and one of the motor terminals. Thus ignitrons 12a and 12b are connected between conductor 11a and motor terminal 10a. Similarly, ignitrons 13 and 13a are in circuit between conductor 11b and motor terminal 10b, and ignitrons 14a and 14b are connected in circuit between conductor 11c and motor terminal 10c.

Associated with one of the ignitron tubes in each pair is a small grid-controlled rectifier tube of the thyratron type, such thyratrons being marked respectively 12c, 13c, and 14c. The filaments of the thyratrons may be heated in any suitable manner, such as by separate secondary windings 16, 17, and 18 of a transformer powered from any suitable single-phase source. The anode of each of the thyratrons is connected through a current-limiting resistor to the anode of the ignitron with which it is associated, the respective current-limiting resistors being marked 19, 20, and 21. The cathode of each of the thyratrons is connected to the ignitor electrode of the corresponding ignitron; that is, the cathode of thyratron 12c is connected to the ignitor electrode of ignitron 12a, etc.

I have provided means for exciting the grids of thyratrons 12c, 13c, and 14c with voltages phased 120° apart relative to one another and continuously controllable in phase over a wide range relative to the voltage of power line 11. This grid-excitation apparatus comprises a small three-phase transformer, the respective primary windings of which are marked T1p, T2p, and T3p, shown as star-connected across the power line 11. The secondary windings of the same transformer are shown as delta-connected and are marked respectively T1s, T2s, and T3s. Each of the aforementioned secondary windings is shunted by a potentiometer, such potentiometers being marked P1, P2, and P3. The arms of the respective potentiometers are mechanically ganged together, and the primary windings of transformers T4, T5, and T6 are delta-connected between the respective potentiometer arms. The secondary of transformer T4 is connected between the grid and cathode of thyratron 12c through a suitable current-limiting resistor 22. The secondary of transformer T5 is similarly connected through a limiting resistor 23 between the grid and cathode of thyratron 13c, while the secondary of transformer T6 is connected through a current-limiting resistor 24 between the grid and cathode of thyratron 14c.

Persons skilled in the art will appreciate that the apparatus just described will provide across the transformer secondaries T4s, T5s, and T6s output voltages which mutually differ in phase by 120° from one another and whose phase relative to the power-line voltage is governed by the position of the potentiometer arms.

This method of obtaining control voltages which are continuously adjustable in phase relative to the powerline voltage is per se conventional and may be replaced by any other suitable arrangement for achieving a similar result.

Associated with each of the ignitrons 12b, 13b, and 14b respectively is a conventional diode rectifier, such rectifiers being marked 12d, 13d, and 14d. These rectifier tubes are shown on the drawing as being of the gas-filled type. Their cathodes may be heated in any suitable manner, as by separate transformer secondaries 25, 26, and 27 of a filament transformer powered from any suitable single-phase source. (Since the supply of filament-heating current to thyratrons and diode rectifiers is conventional, I have not in the drawing shown the complete circuit therefor.)

The anode of diode 12d is connected through current-limiting resistor 28 to the anode of ignitron 12b. Similarly, the anode of diode 13d is connected through current-limiting resistor 29 to the anode of ignitron 13b, and the anode of diode 14d is connected through current-limiting resistor 30 through the anode of ignitron 14b. The cathodes of the diode rectifiers 12d, 13d, and 14d are respectively connected to the ignitor electrodes of the ignitrons with which the diodes are respectively associated.

In operation, control of the motor 10 is effected by adjustment of the ganged potentiometers P1, P2, and P3.

When the potentiometer arms are in such a position that the grid voltages on thyratrons 12c, 13c, and 14c are in opposed-phase relation with the respective anode voltages of the thyratrons, the thyratrons do not fire at any time during the power cycle. As a result no current passes through them, and the motor is stopped.

That this is so may be shown by a simple example. Consider the portion of the power cycle during which conductor 11a is most positive. Conventional current seeking to flow from conductor 11a finds ignitron 12a correctly polarized but non-conducting due to lack of an igniting pulse on the ignitor electrode of that tube, and no such pulse can reach the ignitor because thyratron 12c is non-conducting. At the same time, no current can flow from conductor 11a through ignitron 12b or diode 12d, since those tubes are incorrectly polarized—that is, their cathodes are positive relative to their anodes.

By tracing out the distribution of charge throughout the other parts of the circuit and at other parts of the voltage cycle, a person skilled in the art can quickly confirm that no energizing current can reach the motor when the grid voltages of the thyratron tubes are in opposed-phase relationship with their respective anode voltages.

Now suppose the potentiometer arms be shifted sufficiently to cause the respective thyratrons to "fire" during a relatively small portion of each cycle. Thereupon the ignitrons 12a, 13a, and 14a will successively pass current during the respective periods in which the associated thyratrons are conducting, and the return-path ignitrons 12b, 13b, and 14b will automatically commence conducting at the respective portions of the cycle appropriate to provide a smooth flow of current from the power line through the motor windings.

To illustrate this, let us again assume a portion of the power cycle in which conductor 11a is positive. When thyratron 12c fires, current will flow through it and hence apply a triggering impulse to the ignitor electrode of ignitron 12a. At that instant, ignitron 12a will commence conducting and will carry charge from conductor 11a to input terminal 10a of the motor. The charges will flow through the motor windings and at some time later will appear at motor terminals 10b and 10c. These positive charges will find diodes 13d and/or 14d properly polarized, will travel through them, and will hence provide triggering impulses for the ignitor electrodes of ignitrons 13b and/or 14b. Those tubes at the proper instants of time will thus provide conducting return paths for power current from motor terminals 10b and 10c back to line conductors 11b and 11c.

Similar operations will take place during the other parts of the cycle, producing a flow of energizing current at the proper times through ignitrons 13a and 14a respectively, with appropriate return paths automatically provided through the return-circuit ignitrons.

Because the motor, particularly during its accelerating period, presents a complex load, the times at which conduction must be provided through the return-circuit ignitrons will vary from cycle to cycle, but with the apparatus of my invention such return-circuit ignitrons will automatically fire at precisely the right instant during each portion of the cycle.

As the motor gains speed the potentiometer arm is moved further by the operator and the grid voltages of the respective thyratrons 12c, 13c, and 14c are thus brought gradually into phase with their respective anode voltages. When a fully in-phase condition exists between the grid voltages and anode voltages of the thyratrons, the motor will receive virtually full power from the line, reduced only by the small voltage drop across the ignitrons. The motor will operate normally at rated torque when up to rated speed. At lower speeds its peak torque will be slightly reduced.

In passing, I should point out that under no circumstances, in this invention, can current pass in the reverse direction through the ignitor electrodes of the ignitrons. This is a highly important feature of my invention, since ignitron life is very sharply curtailed by the existence of reverse current through the ignitor electrodes. No such current can flow in my invention, since at all times during the power cycle when the ignitor electrodes are polarized to carry reverse current the ignitor-electrode circuit is completely interrupted by a non-conducting diode or thyratron.

My motor-control circuit has been employed successfully in the control of three-phase motors ranging up to several hundred horsepower, in applications requiring starting and stopping of the motor as frequently as every minute or two. Its performance has been uniformly dependable and trouble-free, due, I believe, primarily to its property of automatically firing the various ignitrons at precisely the proper times during each power cycle. This provides smooth current flow at all power levels without permitting build-up of the large inductive potentials across the motor windings which would result from incorrect phasing of the ignitor voltages.

While I have given emphasis in this specification to the use of my invention in the field of motor control, it will of course be understood that it can be employed with any other desired type of load device.

In this specification I have described in considerable detail a particular embodiment of my invention. It should be understood, however, that this description has been merely exemplary, and that many changes in and departures from the exact circuit shown can be made by persons skilled in the art without departing from the spirit of my invention.

I claim:

1. In a control circuit for supplying power to a load device from a three-phase power line, said load device having a plurality of input terminals, the combination which comprises two banks of ignitron tubes connected between said line and said input terminals to provide going and return current paths for load current, adjustable phasing means connected in circuit with the ignitor electrodes of the ignitrons in one of said banks for initiating the conduction periods of such ignitrons in predetermined phase relation to the power-line voltage, and charge-responsive means connected in circuit respectively between said input terminals and the ignitor electrodes of the ignitrons in said other bank operative to initiate conduction periods of said other ignitrons in automatic response to the accumulation of charge on said input terminals, whereby said other ignitrons provide timed return paths for load current flowing through said load device via the ignitrons in said first bank.

2. In a motor-control circuit for supplying power to a three-phase motor from a three-phase power line, said motor having a plurality of input terminals, the combination which comprises two banks of ignitron tubes connected between said line and said motor terminals to provide going and return current paths for motor current, adjustable phasing means connected in circuit with the ignitor electrodes of the ignitrons in one of said banks for initiating the conduction periods of such ignitrons in predetermined phase relation to the power-line voltage, and means comprising a plurality of rectifiers respectively connected in circuit between said motor terminals and the ignitor electrodes in said other bank operative automatically to initiate conduction periods of such respective other ignitrons responsively to accumulation of charge on said respective motor terminals, whereby said other ignitrons provide timed return paths for motor current flowing through said motor via the ignitrons in said first bank.

3. In a motor-control circuit for supplying power to a three-phase motor from a three-phase power line, said motor having a plurality of input terminals, the combination which comprises three pairs of ignitron tubes, the tubes in each pair being connected back-to-back and each such pair being connected between one of the conductors of said power line and one of said input terminals, substantially as shown and described, phase-adjustable voltage-supply means connected in circuit with the ignitor electrode of one ignitron in each of said pairs for controllably initiating conduction periods in said ignitrons during predetermined portions of the power-line voltage cycle, and a rectifier means for each of the other ignitrons, each of said rectifiers being connected in circuit between a motor input terminal and the ignitor element of the ignitron with which such rectifier is associated, such rectifiers being respectively operative to conduct charge from said respective motor terminals to such respective ignitor electrodes, whereby conduction periods are initiated automatically in such other ignitrons in timed relationship to provide return paths for motor current flowing through said motor via said first-mentioned ignitrons.

4. A motor-control circuit according to claim 3 wherein each of said rectifiers means comprises a diode tube having an anode and a cathode, the anode of each such diode tube being connected in circuit with a motor terminal and the cathode of each such diode tube being connected in circuit with the ignitor electrode of the ignitron associated therewith.

5. In a motor-control circuit for supplying power to a three-phase motor from a three-phase power line, said motor having a plurality of input terminals, the combination which comprises three pairs of ignitron tubes, the tubes in each pair being connected back-to-back and each such pair being connected between one of the conductors of said power line and one of said input terminals, substantially as shown and described, a grid-controlled rectifier tube associated with one ignitron in each of said pairs, each of said rectifier tubes having a cathode, an anode, and a grid, the anode of each such rectifier being connected in circuit with the anode of its associated ignitron and the cathode of each such rectifier tube being connected in circuit with the ignitor electrode of such associated ignitron, a diode rectifier tube associated with each of the other ignitrons in said pairs, each of said diode rectifier tubes having an anode and a cathode and having its anode connected in circuit with the anode of its associated ignitron and its cathode connected in circuit with the ignitor electrode of such ignitron, and controllable phase voltage-supply means for supplying control voltage to the grids of said grid-controlled rectifier tubes for initiating conduction periods of said first-mentioned ignitron tubes during predetermined portions of the power-line voltage cycle, said diode rectifier tubes being operative responsively to accumulation of charge on said motor terminals to initiate automatically conduction periods in said last-mentioned ignitron tubes to provide timed return paths for motor current flowing through said motor via said first-mentioned ignitrons.

No references cited.

Notice of Adverse Decision in Interference

In Interference No. 89,092 involving Patent No. 2,771,574, C. Wetter, Motor-control apparatus, final judgment adverse to the patentee was rendered July 23, 1962, as to claims 1, 2, 3, 4 and 5.

[*Official Gazette December 4, 1962.*]